US008617415B2

(12) United States Patent
Yang et al.

(10) Patent No.: US 8,617,415 B2
(45) Date of Patent: Dec. 31, 2013

(54) HEAT TRANSFER FLUIDS AND CORROSION INHIBITOR FORMULATIONS FOR USE THEREOF

(75) Inventors: Bo Yang, Ridgefield, CT (US); Aleksei Gershun, Southbury, CT (US); Peter Woyciesjes, Woodbury, CT (US)

(73) Assignee: Prestone Products Corporation, Lake Forest, IL (US)

( * ) Notice: Subject to any disclaimer, the term of this patent is extended or adjusted under 35 U.S.C. 154(b) by 40 days.

(21) Appl. No.: 12/613,829

(22) Filed: Nov. 6, 2009

(65) Prior Publication Data

US 2010/0116473 A1     May 13, 2010

Related U.S. Application Data

(60) Provisional application No. 61/112,367, filed on Nov. 7, 2008.

(51) Int. Cl.
*C09K 5/00*     (2006.01)
(52) U.S. Cl.
USPC ............... 252/71; 252/73; 252/75; 252/78
(58) Field of Classification Search
USPC ........................................................... 252/73
See application file for complete search history.

(56) References Cited

U.S. PATENT DOCUMENTS

| 4,528,108 | A | 7/1985 | Grover |
| 5,018,577 | A | 5/1991 | Pardue et al. |
| 5,080,818 | A | 1/1992 | Tachiiwa |
| 5,606,105 | A | 2/1997 | Davis et al. |
| 6,143,243 | A | 11/2000 | Gershun et al. |
| 6,572,789 | B1 | 6/2003 | Yang et al. |
| 2003/0164470 | A1* | 9/2003 | Wenderoth et al. ............. 252/71 |
| 2007/0034825 | A1* | 2/2007 | Wenderoth et al. ............. 252/70 |
| 2007/0034826 | A1 | 2/2007 | Woyciesjes |
| 2007/0120094 | A1 | 5/2007 | Yang et al. |
| 2007/0158609 | A1 | 7/2007 | Hong et al. |

FOREIGN PATENT DOCUMENTS

| EP | 0245557 A2 | 11/1987 |
| EP | 0487194 A1 | 5/1992 |

OTHER PUBLICATIONS

International Search Report for PCT/US2009/063587 dated May 27, 2010.
Written Opinion of the International Searching Authority for PCT/US2009/063587 dated May 27, 2010.
Decision on Appeal re *Ex Parte Thomas L. Block et al.* Appeal No. 2009-005354 dated Nov. 30, 2010.—U.S. Appl. No. 10/159,539, Publication No. 2003-0008592, Patent No. 8,361,912.
Decision on Appeal re *Ex Parte Igor Igorevich Stukanov*. Appeal No. 2012-001722 dated Mar. 5, 2013—U.S. Appl. No. 11/650,556, Publication No. 2007-0282252.
European Search Report of Appl. No. 09825497.2 dated Sep. 13, 2013.

* cited by examiner

*Primary Examiner* — Necholus Ogden, Jr.
(74) *Attorney, Agent, or Firm* — Brian R. Dorn; Barnes & Thornburg LLP

(57) ABSTRACT

Disclosed herein is a heat transfer fluid comprises: a freezing point-depressant; an aliphatic carboxylic acid, a salt thereof, or a combination of the foregoing; an inorganic phosphate; a magnesium compound; deionized water; and a component selected from the group consisting of azole compounds, copper alloy corrosion inhibitors, phosphonocarboxylates, phosphinocarboxylates, and combinations of two or more of the foregoing components. Also described is a heat transfer system comprising the heat transfer fluid.

20 Claims, 1 Drawing Sheet

HEAT TRANSFER FLUIDS AND CORROSION INHIBITOR FORMULATIONS FOR USE THEREOF

CROSS REFERENCE TO RELATED APPLICATIONS

This application claims the benefit of U.S. Provisional Patent Application No. 61/112,367 filed on Nov. 7, 2008, which is incorporated by reference herein in its entirety.

BACKGROUND

Modern vehicle engines generally require a heat transfer fluid (liquid coolant) to provide long-lasting, year-round protection of their cooling systems. The primary requirements of the heat transfer fluids are that they provide efficient heat transfer to control and maintain engine temperature for efficient fuel economy and lubrication, and prevent engine failures due to freeze-up, boiling-over, or over-heating. An additional key requirement of a heat transfer fluid is that it provides corrosion protection of all cooling system metals over a wide range of temperature and operating conditions. Beyond metal protection, corrosion protection helps the heat transfer fluid to fulfill its primary function of transferring excess heat from the engine to the radiator for dissipation.

A typical modern automotive cooling system contains various components to fulfill its design functions. Particularly, an automotive cooling system can contain the following components: an engine, a radiator, a coolant pump, a fan, a heater core, heater hose, heater control valve, thermostat, radiator hose, and overflow reservoir. Additional components may be incorporated, such as a transmission oil cooler and/or an engine oil cooler in some diesel powered or high performance vehicles, a heat sink in gas-electric hybrid vehicles, and an intercooler in some vehicles containing a turbocharged engine. Many different kinds of metals are typically used to fabricate the various parts of cooling system components. For example, cast iron and cast aluminum alloys may be used for cylinder blocks, cylinder heads, intake manifolds, coolant pumps, and power electronic device enclosures. Wrought aluminum and copper alloys may be used for radiators and heater cores. Solders may be used to join the components of brass or copper radiators or heater cores. Steel is frequently used for cylinder head gaskets and for small components such as freeze plugs, coolant pump housing enclosures, and coolant pump impellers. Copper alloys are often used in thermostats.

Many types of problems can be encountered in engine cooling systems including corrosion. Common corrosion-related problems in automotive cooling systems include (1) cavitation corrosion and rusting of the cylinder heads and cylinder blocks; (2) seal leakage, bellows seal failure, and cavitation corrosion in water pumps; (3) solder bloom, scale and deposit formation, and pitting in radiators and heater cores; (4) thermostat sticking; and (5) crevice corrosion at hose necks. In addition, erosion-corrosion, galvanic corrosion, under-deposit corrosion, and stray-current corrosion can occur at susceptible locations and conditions in cooling systems.

To ensure long service life and to fulfill their design functions, metal components used in automotive cooling systems have to be protected from corrosion by the heat transfer fluid. In addition, the heat transfer fluid should be compatible with non-metals (such as hoses, gaskets and plastics) used in cooling systems. Excessive corrosion or degradation of material used in the cooling system can lead to a substantial reduction in the strength of a material or component, to a loss of heat transfer fluid from the system, and to the subsequent malfunction of one or more of the cooling system components. All of these events may result in engine failure. Furthermore, it should be noted that even relatively mild corrosion can result in the formation of corrosion products that can form scales or deposits on heat transfer surfaces. These scales or deposits can greatly reduce heat transfer rate. Excessive scale or corrosion product deposition can also lead to restriction of heat transfer fluid flow in the radiator and heater core tubes, even plugging the heater core and/or radiator. Substantial heat transfer rate reduction and flow restriction of the heat transfer fluid can lead to overheating of the engine.

In addition to providing reliable corrosion protection for various metallic components in the cooling systems, a heat transfer fluid should also have following properties to fulfill its requirements for use as a year-round functional fluid for a vehicle: high thermal conductivity, high heat capacity or high specific heat, good fluidity within the temperature range of use, high boiling point, low freezing point, low viscosity, low toxicity and safe to use, cost effective and have adequate supply, chemically stable over the temperature and conditions of use, low foaming tendency, good material compatibility, i.e., does not corrode, erode or degrade system materials, including both metallic and nonmetallic materials.

To satisfy the customer's desire for more power, comfort and safety, and to meet the need of lower fuel consumption and reduced exhaust emission, new vehicle technologies are being developed constantly. Extensive efforts are being devoted to research to develop new and more environmentally friendly propulsion technologies, such as fuel cell and petroleum-hybrid electric power, and new material technologies, new cost effective manufacturing technologies, and to explore new methods to increase the use of lighter metals and/or materials. New heat transfer fluid technologies are often required to satisfy the needs of the new cooling systems or to improve heat transfer fluid performance, such as improved corrosion protection.

Improvements in coolant corrosion protection of metals are required to enhance corrosion protection to meet the needs of the new cooling systems. Particularly, there is an ongoing need for improvement of the corrosion protection performance of heat transfer fluids for use in cooling systems containing heat exchangers produced by controlled atmosphere brazing (CAB) process, and corrosion protection at high temperature.

BRIEF DESCRIPTION

Surprisingly we have found that the heat transfer fluid resistance to thermal degradation (heat transfer fluid stability) after very long period of use tends to be better if the heat transfer fluid corrosion protection performance is better. Thus, there is a need for heat transfer fluids that will provide improved corrosion protection of all the metals and metallic components in automotive cooling systems.

This need is met, at least in part, by a heat transfer fluid comprising:

a freezing point-depressant;
an aliphatic carboxylic acid, a salt thereof, or a combination of the foregoing;
an inorganic phosphate;
a magnesium compound;
deionized water; and
a component selected from the group consisting of azole compounds, copper alloy corrosion inhibitors, phosphonocarboxylates, phosphinocarboxylates, and combinations of two or more of the foregoing components.

Also described herein is a heat transfer system comprising a heat transfer fluid as described herein and a heat transfer apparatus.

DETAILED DESCRIPTION

Figure 1:
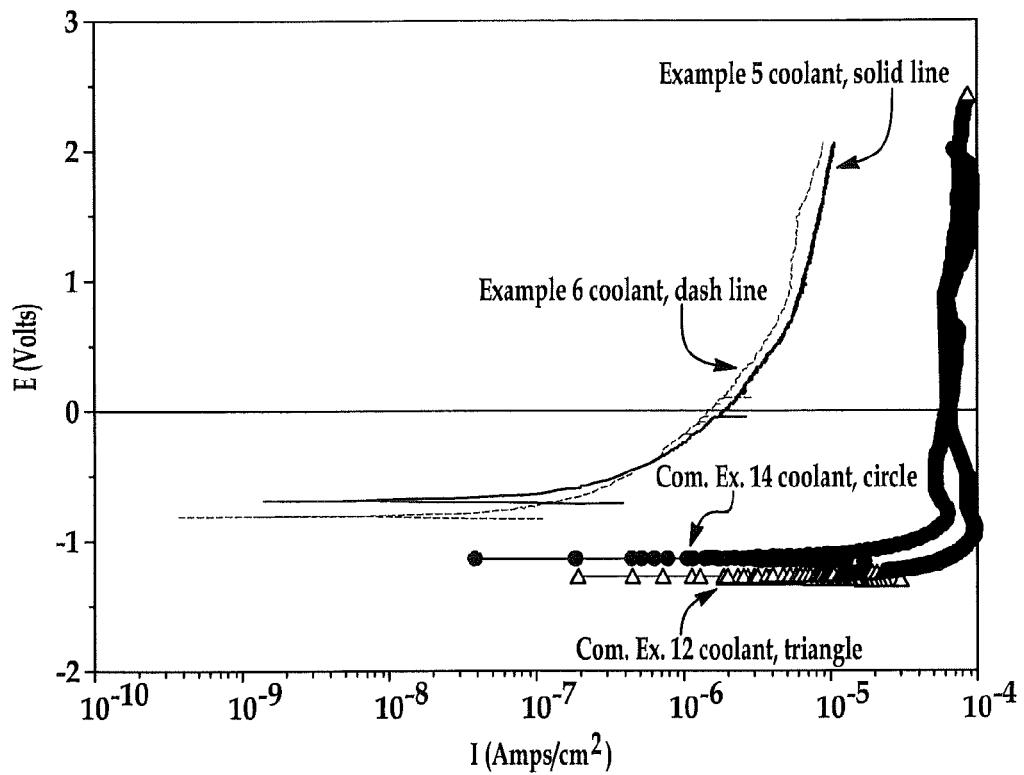
FIG. 1 is a polarization curve for Examples 5 and 6 and Comparative Examples 12 and 14.

Disclosed herein are heat transfer fluid compositions that provide improved protection against corrosion of metals using in cooling systems, protection against freezing and boil-over, and as well as having low foam tendency that is in compliance with ASTM D3306 requirements. Particularly, the corrosion protection of metals and metallic components in cooling systems containing heat exchangers produced by controlled atmosphere brazing process and corrosion protection at high temperature is improved.

The heat transfer fluids comprise a unique combination of mono and/or dibasic aliphatic carboxylic acids or the salts thereof, an inorganic phosphate, a magnesium compound, and a component selected from the group consisting of azole compounds, copper alloy corrosion inhibitors, phosphonocarboxylates, phosphinocarboxylates, and combinations of two or more of the foregoing components. The heat transfer fluid may further comprise optional components such as polymer dispersants, scale inhibitors, additional corrosion inhibitors, and the like. The heat transfer fluid can comprise less than or equal to 100 ppm of nitrate ion, or, more specifically, less than or equal to 80 ppm of nitrate ion, or, even more specifically less than or equal to 40 ppm of nitrate ion.

The heat transfer fluid can be free of nitrite, ammonium ions and ammonia. The heat transfer fluid can be free of 2-phosphonobutane-1,2,4-tricarboxylic acid or its salts. The heat transfer fluid can be free of ammonium ions, ammonia, 2-phosphonobutane-1,2,4-tricarboxylic acid and its salts. The heat transfer fluid can comprise less than or equal to 80 ppm of nitrate, less than or equal to 0.03 weight percent of 2-phosphonobutane-1,2,4-tricarboxylic acid and its salts and be free of ammonium ions and ammonia. The heat transfer fluid can comprise less than or equal to 40 ppm of nitrate and be free of nitrite, 2-phosphonobutane-1,2,4-tricarboxylic acid and its salts, ammonium ions, and ammonia. The heat transfer fluid can be free of nitrite, nitrate, ammonia, ammonium ions, 2-phosphonobutane-1,2,4-tricarboxylic acid and its salts.

The freezing point depressant can be an alcohol or mixture of alcohols. Exemplary alcohols include monohydric or polyhydric alcohols and mixtures thereof. The alcohol can be selected from the group consisting of methanol, ethanol, propanol, butanol, furfurol, furfuryl alcohol, tetrahydrofurfuryl alcohol, ethoxylated furfuryl alcohol, ethylene glycol, propylene glycol, 1,3-propanediol, glycerol, diethylene glycol, triethylene glycol, 1,2-propylene glycol, 1,3-propylene glycol, dipropylene glycol, butylene glycol, glycerol-1,2-dimethyl ether, glycerol-1,3-dimethyl ether, monoethylether of glycerol, sorbitol, 1,2,6-hexanetriol, trimethylopropane, alkoxy alkanols such as methoxyethanol, and combinations of two or more of the foregoing.

The freezing point depressant can be present in an amount of about 10 weight percent (wt %) to about 99.9 wt %, based on the total weight of the heat transfer fluid. Within this range the freezing point depressant can be present in an amount greater than or equal to about 30 wt %, or, more specifically, greater than or equal to about 40 wt %. Also within this range the freezing point depressant can be present in an amount less than or equal to about 99.5 wt %, or, more specifically, less than or equal to about 99 wt %.

The aliphatic carboxylic acid, salt thereof or combination of the foregoing (referred to hereafter as the aliphatic carboxylate) has 6 to 15 carbon atoms. The aliphatic carboxylate may comprise a single or multiple carboxyl groups and may be linear or branched. Exemplary aliphatic carboxylates include 2-ethyl hexanoic acid, neodecanoic acid and sebacic acid.

The aliphatic carboxylate can be present in an amount of about 0.05 wt % to about 10 weight percent, based on the total weight of the heat transfer fluid. Within this range the aliphatic carboxylate can be present in an amount greater than or equal to about 0.1 wt %, or, more specifically, greater than or equal to about 0.2 wt %. Also within this range the aliphatic carboxylate can be present in an amount less than or equal to about 7 wt %, or, more specifically, less than or equal to about 5 wt %.

The inorganic phosphate can be phosphoric acid, sodium orthophosphate, postassium orthophosphate, sodium pyrophosphate, potassium pyrophosphate, sodium polyphosphate, potassium polyphosphate, sodium hexametaphosphate, potassium hexametaphosphate or a combination of two or more of the foregoing phosphates. 5 weight percent, based on the total weight of the heat transfer fluid. Within this range the inorganic phosphate can be present in an amount greater than or equal to about 0.005 wt %, or, more specifically, greater than or equal to about 0.010 wt %. Also within this range the inorganic phosphate can be present in an amount less than or equal to about 3 wt %, or, more specifically, less than or equal to about 1 wt %.

The magnesium compound is compound that can produce magnesium ions upon dissolving in a water containing solution at room temperature. The magnesium compound can be an inorganic magnesium compound such as magnesium nitrate, magnesium sulfate, or a combination thereof. The magnesium compound is soluble in the heat transfer fluid. Soluble, as used herein, is defined as dissolving such that no particulate matter is visible to the naked eye. The magnesium compound can also be magnesium salt formed between magnesium ions and an organic acid containing one or more carboxylic acid groups, such as magnesium polyacrylate, magnesium polymaleate, magnesium lactate, magnesium citrate, magnesium tartrate, magnesium gluconate, magnesium glucoheptonate, magnesium glycolate, magnesium glucarate, magnesium succinate, magnesium hydroxysuccinate, magnesium adipate, magnesium oxalate, magnesium malonate, magnesium sulfamate, magnesium formate, magnesium acetate, magnesium propionate, magnesium salt of aliphatic tri-carboxylic acid or aliphatic tetra-carboxylic acid, and combinations of the foregoing magnesium compounds.

The magnesium compound can be present in an amount such that the heat transfer fluid has a magnesium ion concentration of 0.5 to 100 parts per million by weight (ppm) of the heat transfer fluid. Within this range the magnesium ion concentration can be greater than or equal to about 1 ppm, or, more specifically, greater than or equal to about 2 ppm. Also within this range the magnesium ion concentration can be less than or equal to about 50 ppm, or, more specifically, less than or equal to about 30 ppm.

The heat transfer fluid further comprises a component selected from the groups consisting of azole compounds, copper alloy corrosion inhibitors, phosphonocarboxylates, phosphinocarboxylates, and combinations of two or more of the foregoing components.

Exemplary azole compounds include benzotriazole, tolyltriazole, methyl benzotriazole (e.g., 4-methyl benzotriazole and 5-methyl benzotriazole), butyl benzotriazole, and other alkyl benzotriazoles (e.g., the alkyl group contains from 2 to 20 carbon atoms), mercaptobenzothiazole, thiazole and other substituted thiazoles, imidazole, benzimidazole, and other substituted imidazoles, indazole and substituted indazoles, tetrazole and substituted tetrazoles. Combinations of two or more of the foregoing azoles may also be used.

The azole compound may be used in an amount of about 0.01 wt % to about 4 wt %, based on the total weight of the heat transfer fluid. Within this range the azole compound can be present in an amount greater than or equal to about 0.05 wt %, or, more specifically, greater than or equal to about 0.1 wt %. Also within this range the azole compound can be present in an amount less than or equal to about 2 wt %, or, more specifically, less than or equal to about 1 wt %.

Phosphonocarboxylates are phosphonated compounds having the general formula

H[CHRCHR]$_n$—PO$_3$M$_2$ wherein at least one R group in each unit is a COOM, CH$_2$OH, sulphono or phosphono group and the other R group which may be the same as, or different from, the first R group, is a hydrogen or a COOM, hydroxyl, phosphono, sulphono, sulphato, C$_{1-7}$ alkyl, C$_{1-7}$ alkenyl group or a carboxylate, phosphono, sulphono, sulphato and/or hydroxyl substituted C$_{1-7}$ alkyl or C$_{1-7}$ alkenyl group, n is 1 or an integer greater than 1, and each M is hydrogen or an alkali metal ion such as a sodium ion, potassium ion and the like. Furthermore, at least one COOM group will be present in one of the R group. Preferably, the phosphonocarboxylates are phosphonated oligomers or mixture of phosphonated oligomers of maleic acid, of the formula H[CH(COOM)CH(COOM)]$_n$—PO$_3$M$_2$, where n is 1 or an integer greater than 1, and M is a cationic species (e g , alkali metal cations) such that the compound is water soluble. Exemplary phosphonocarboxylates include phosphonosuccinic acid, 1-phosphono-1,2,3,4-tetracarboxybutane, and 1-phosphono-1,2,3,4,5,6-hexacarboxyhexane. The phosphonocarboxylates can be a mixture of compounds having the preceding formula with differing values for "n". The mean value of "n" can be 1 to 2, or, more specifically, 1.3 to 1.5. The synthesis of the phosphonocarboxylates is known and described in U.S. Pat. No. 5,606,105.

The phosphonocarboxylate may be used in an amount of about 0.5 ppm to about 0.15 wt %, based on the total weight of the heat transfer fluid. Within this range the phosphonocarboxylate can be present in an amount greater than or equal to about 2 ppm, or, more specifically, greater than or equal to about 5 ppm. Also within this range the phosphonocarboxylate can be present in an amount less than or equal to about 0.05 wt %, or, more specifically, less than or equal to about 0.02 wt %.

Phosphinocarboxylates are compounds having the general formula

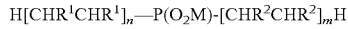

H[CHR$^1$CHR$^1$]$_n$—P(O$_2$M)-[CHR$^2$CHR$^2$]$_m$H wherein at least one R$^1$ group in each unit is a COOM, CH$_2$OH, sulphono or phosphono group and the other R$^1$ group which may be the same as, or different from, the first R$^1$ group, is a hydrogen or a COOM, hydroxyl, phosphono, sulphono, sulphato, C$_{1-7}$ alkyl, C$_{1-7}$ alkenyl group or a carboxylate, phosphono, sulphono, sulphato and/or hydroxyl substituted C$_{1-7}$ alkyl or C$_{1-7}$ alkenyl group, n is an integer equal to or greater than 1, and each M is hydrogen or an alkali metal ion such as a sodium ion, potassium ion and the like Similarly, at least one R$^2$ group in each unit is a COOM, CH$_2$OH, sulphono or phosphono group and the other R$^2$ group which may be the same as, or different from, the first R$^2$ group, is a hydrogen or a COOM, hydroxyl, phosphono, sulphono, sulphato, C$_{1-7}$ alkyl, C$_{1-7}$ alkenyl group or a carboxylate, phosphono, sulphono, sulphato and/or hydroxyl substituted C$_{1-7}$ alkyl or C$_{1-7}$ alkenyl group, m is an integer equal to or greater than 0. Furthermore, at least one COOM group will be present in one of the R$^1$ and R$^2$ groups. Exemplary phosphinocarboxylates include phosphinicosuccinic acid and water soluble salts, phosphinicobis(succinic acid) and water soluble salts and phosphinicosuccinic acid oligomer and salts as described in U.S. Pat. No. 6,572,789 and No. 5,018,577. The phosphonocarboxylates can be a mixture of compounds having the preceding formula with differing values for "n" and "m".

The phosphinocarboxylate may be used in an amount of about 0.5 ppm to about 0.2 wt %, based on the total weight of the heat transfer fluid. Within this range the phosphinocarboxylate can be present in an amount greater than or equal to about 3 ppm, or, more specifically, greater than or equal to about 10 ppm. Also within this range the phosphinocarboxylate can be present in an amount less than or equal to about 0.1 wt %, or, more specifically, less than or equal to about 0.05 wt %.

The heat transfer fluid additionally comprises water. Water suitable for use includes deionized water or de-mineralized water. The water may be used in an amount of about 0.1 wt % to about 90 wt %, based on the total weight of the heat transfer fluid. Within this range water can be present in an amount greater than or equal to 0.5 wt %, or, more specifically, greater than or equal to 1 wt %. Also within this range water can be present in an amount less than or equal to 70 wt %, or, more specifically, less than or equal to 60 wt %.

The heat transfer fluid may optionally comprise one or more water soluble polymers (MW: 200 to 200,000 Daltons), such as polycarboxylates, e.g., polyacrylic acids or polyacrylates, acrylate based polymers, copolymers, terpolymers, and quadpolymers, such as acrylate/acrylamide copolymers, polymethacrylates, polymaleic acids or maleic anhydride polymers, maleic acid based polymers, their copolymers and terpolymers, modified acrylamide based polymers, including polyacrylamides, acrylamide based copolymers and terpolymers; In general, water soluble polymers suitable for use include homo-polymers, copolymers, terpolymer and interpolymers having (1) at least one monomeric unit containing C$_3$ to C$_{16}$ monoethylenically unsaturated mono- or dicarboxylic acids or their salts; or (2) at least one monomeric unit containing C$_3$ to C$_{16}$ monoethylenically unsaturated mono- or dicarboxylic acid derivatives such as amides, nitriles, carboxylate esters, acid halides (e.g., chloride), and acid anhydrides, and combination thereof.

The heat transfer fluid may optionally comprise one or more of an antifoaming agent or defoamer, dispersant, scale inhibitor, surfactant, colorant and other coolant additives.

Exemplary surfactants include fatty acid esters, such as sorbitan fatty acid esters, polyalkylene glycols, polyalkylene glycol esters, copolymers of ethylene oxide (EO) and propylene oxide (PO), polyoxyalkylene derivatives of a sorbitan fatty acid ester, and mixtures thereof. The average molecular weight of the non-ionic surfactants can be about 55 to about 300,000, or, more specifically about 110 to about 10,000. Suitable sorbitan fatty acid esters include sorbitan monolaurate (e.g., sold under tradename Span® 20, Arlacel® 20, S-MAZ® 20M1), sorbitan monopalmitate (e.g., Span® 40 or Arlacel® 40), sorbitan monostearate (e.g., Span® 60, Arlacel® 60, or S-MAZ® 60K), sorbitan monooleate (e.g., Span® 80 or Arlacel® 80), sorbitan monosesquioleate (e.g., Span® 83 or Arlacel® 83), sorbitan trioleate (e.g., Span® 85 or Arlacel® 85), sorbitan tridtearate (e.g., S-MAZ® 65K), sorbitan monotallate (e.g., S-MAZ® 90). Suitable polyalkylene glycols include polyethylene glycols, polypropylene glycols, and mixtures thereof. Examples of polyethylene glycols suitable for use include CARBOWAX™ polyethylene glycols and methoxypolyethylene glycols from Dow Chemical Company, (e.g., CARBOWAX PEG 200, 300, 400, 600, 900, 1000, 1450, 3350, 4000 & 8000, etc.) or PLURACOL® polyethylene glycols from BASF Corp. (e.g., Pluracol® E 200, 300, 400, 600, 1000, 2000, 3350, 4000, 6000 and 8000, etc.). Suitable polyalkylene glycol esters include mono -and di-esters of various fatty acids, such as MAPEG® polyethylene glycol esters from BASF (e.g., MAPEG® 200ML or PEG 200 Monolaurate, MAPEG® 400 DO or PEG 400 Dioleate, MAPEG® 400 MO or PEG 400 Monooleate, and MAPEG® 600 DO or PEG 600 Dioleate, etc.). Suitable copolymers of ethylene oxide (EO) and propylene oxide (PO) include various Pluronic and Pluronic R block copolymer surfactants from BASF, DOWFAX non-ionic surfactants, UCON™ fluids and SYNALOX lubricants from DOW Chemical. Suitable polyoxyalkylene derivatives of a sorbitan fatty acid ester include polyoxyethylene 20 sorbitan monolaurate (e.g., products sold under trademarks TWEEN 20 or T-MAZ 20), polyoxyethylene 4 sorbitan monolaurate (e.g., TWEEN 21), polyoxyethylene 20 sorbitan monopalmitate (e.g., TWEEN 40), polyoxyethylene 20 sorbitant monostearate (e.g., TWEEN 60 or T-MAZ 60K), polyoxyethylene 20 sorbitan monooleate (e.g., TWEEN 80 or T-MAZ 80), polyoxyethylene 20 tristearate (e.g., TWEEN 65 or T-MAZ 65K), polyoxyethylene 5 sorbitan monooleate (e.g., TWEEN 81 or T-MAZ 81), polyoxyethylene 20 sorbitan trioleate (e.g., TWEEN 85 or T-MAZ 85K) and the like.

Exemplary antifoam agents include polydimethylsiloxane emulsion based antifoams. They include PC-5450NF from Performance Chemicals, LLC in Boscawen, N.H.; CNC antifoam XD-55 NF and XD-56 from CNC International in Woonsocket in RI. Other antifoams suitable for use in the instant invention include copolymers of ethylene oxide (EO) and propylene oxide (PO), such as Pluronic L-61 from BASF.

Generally, the optional antifoam agents may comprise a silicone, for example, SAG 10 or similar products available from OSI Specialties, Dow Corning or other suppliers; an ethylene oxide-propylene oxide (EO-PO) block copolymer and a propylene oxide-ethylene oxide-propylene oxide (PO-EP-PO) block copolymer (e.g., Pluronic L61, Pluronic L81, or other Pluronic and Pluronic C products); poly(ethylene oxide) or poly(propylene oxide), e.g., PPG 2000 (i.e., polypropylene oxide with an average molecular weight of 2000); a hydrophobic amorphous silica; a polydiorganosiloxane based product (e.g., products containing polydimethylsiloxane (PDMS), and the like); a fatty acids or fatty acid ester (e.g., stearic acid, and the like); a fatty alcohol, an alkoxylated alcohol and a polyglycol; a polyether polyol acetate, a polyether ethoxylated sorbital hexaoleate, and a poly(ethylene oxide-propylene oxide) monoallyl ether acetate; a wax, a naphtha, kerosene and an aromatic oil; and combinations comprising one or more of the foregoing antifoam agents.

The heat transfer fluid can contain organic and inorganic ingredients, including (1) pH buffers, such as borates and benzoates and/or their combinations, (2) silicate and silicones, mainly used for aluminum alloys and ferrous metal corrosion protection, and (3) other corrosion inhibitors, such as molybdates. Based on the amount of silicate in the inhibitor package, commercial engine coolants may be classified as conventional high silicate-based coolants (silicate technology or SiT coolants), organic acid-based coolants (organic acid technology or OAT coolants), and low silicate+organic acid hybrid coolants (hybrid organic acid technology or HOAT coolants).

A method of preventing corrosion comprises contacting a heat transfer fluid as described herein with a heat transfer system. The heat transfer system can comprise components made by controlled atmosphere brazing. The heat transfer system may comprise aluminum.

The heat transfer fluid is further demonstrated by the following non-limiting examples.

EXAMPLES

The examples were made using the materials shown in Table 1.

TABLE 1

| Component | Description |
|---|---|
| EG | Ethylene glycol |
| Water | |
| NaOH | 50 wt % aqueous solution of NaOH |
| KOH | 45 wt % aqueous solution of KOH |
| $H_3PO_4$ | 75 wt % aqueous solution of $H_3PO_4$ |
| Sebacic acid | Potassium salt of sebacic acid |
| 4-tert butyl benzoic acid | Raw material purchased from Sigma Aldrich, St Louis, MO 63178 was used. |
| Bayhibit ® AM | 50 wt % aqueous solution of 2-phosphonobutane-1,2,4-tricarboxylic acid. Bayhibit ® AM is commercially available from Bayer AG, Germany |
| Bricorr 288 | 28% active (as acid) of phosphonosuccinic acid, phosphonosuccinic acid dimers and phosphonosuccinic acid trimers. Bricorr 288 is commercially available from Rhodia Inc. (USA), as sodium salts of the acids |
| Na-TT | 50 wt % aqueous solution of tolyltriazole sodium salt which is a mixture of about 60% 5-methylbenzotriazole and about 40% 4-methylbenzotriazole and commercially available from PMC Specialties Group, Inc., Cincinnati, OH 45217. |
| $NaNO_3$ | 45 wt % aqueous solution of sodium nitrate |
| Orange liquid 10245 dye | Colorant commercially available from Chromatech. |
| Chromatint Orange 175 | Colorant commercially available from Chromatech. |
| PM 5150 | A polypropylene glycol (having an average molecular weight of about 2000) based antifoam commercially available from Prestone Product Corporation, CT 06810. |
| $Mg(NO_3)_2 \cdot 6 H_2O$ | Magnesium nitrate hexahydrate |
| $Ca(NO_3)_2 \cdot 4 H_2O$ | Calcium nitrate tetrahydrate |
| Neodecanoic acid | |
| Tenax WS5520 | CAS Reg. No. = 154730-82-2, reaction products of maleated tall oil fatty acid anhydride, diethylene glycol ester and their sodium or potassium salts, commercially available from MeadWestvaco |
| EPML-483 | Polymerizable-acid graft polymers described in U.S. Pat. No. 6,143,243. |
| 2-EHA | 2-ethyl hexanoic acid |
| Molybdate | 41.1% aqueous solution of sodium molybdate dihydrate. |
| AR-940 | Sodium polyacrylate solution; MW = 2600, 40% solids |

Example 1 and Comparative Examples 1-5

The compositions shown in Table 2 were tested according to ASTM D4340 using SAE 319 sand cast aluminum alloy as the test specimen. In some cases, the ASTM D4340 procedure was modified to use 50vol % coolant+50vol % deionized water as the test solution, as indicated in the Table. Amounts in Table 2 are in weight percent based on the total weight of the heat transfer fluid.

TABLE 2

| Component | Comp Ex. 1 | Comp Ex. 2 | Comp. Ex. 3 | Comp. Ex. 4 | Comp. Ex. 5 | Example 1 |
|---|---|---|---|---|---|---|
| EG | 94.1172 | 94.0390 | 90.8019 | 93.6259 | 93.6542 | 93.6138 |
| Water | 1.2454 | 1.2444 | 1.8749 | 1.2389 | 1.2393 | 1.2387 |
| NaOH | 1.7868 | 1.8287 | 0.0690 | 2.0658 | 2.0735 | 2.0655 |
| KOH | — | — | 2.6155 | — | — | — |
| $H_3PO_4$ | — | — | — | 0.2486 | 0.2486 | 0.2485 |
| Sebacic acid | 2.0457 | 2.0420 | — | 2.0330 | 2.0337 | 2.0328 |

TABLE 2-continued

| Component | Comp Ex. 1 | Comp Ex. 2 | Comp. Ex. 3 | Comp. Ex. 4 | Comp. Ex. 5 | Example 1 |
|---|---|---|---|---|---|---|
| 4-tert butyl benzoic acid | — | — | 3.9842 | — | — | — |
| Bayhibit ® AM | — | 0.0799 | 0.0799 | — | — | — |
| Bricorr 288 | 0.0375 | — | — | 0.0373 | — | 0.0373 |
| Na-TT | 0.1993 | 0.1991 | 0.5625 | 0.1982 | — | 0.1982 |
| $NaNO_3$ | 0.4982 | 0.4978 | — | 0.4956 | 0.4957 | 0.4955 |
| Orange liquid 10245 dye | 0.0503 | 0.0503 | — | 0.0501 | 0.0501 | 0.0500 |
| PM 5150 | 0.0067 | 0.0067 | — | 0.0066 | 0.0066 | 0.0066 |
| $Mg(NO_3)_2 \cdot 6 H_2O$ | 0.0100 | 0.0095 | 0.0095 | — | — | 0.0100 |
| $Ca(NO_3)_2 \cdot 4 H_2O$ | 0.0030 | 0.0027 | 0.0027 | — | — | 0.0030 |
|  | 50 v % | 50 v % |  |  |  |  |
| Corrosion rate (mg/cm²/wk) | 0.53 | 1.12 | 0.75 | 5.29 | 4.10 | 0.12 |

Table 2 shows that Example 1 has clearly much better corrosion protection performance than the comparative fluids in ASTM D4340 test. Comparative Example 1 differs from Example 1 in that Comparative Example 1 lacks an inorganic phosphate. Example 1 demonstrates markedly improved corrosion protection. Similarly, Comparative Example 4 differs from Example 1 in that Comparative Example 3 lacks the aliphatic carboxylate and contains instead an aromatic carboxylate. Example 1 demonstrates markedly improved corrosion protection compared to Comparative Example 3. Comparative Examples 4 and 5, when compared to Example 1, show the dramatic effect of the inorganic magnesium compound.

Examples 2-4 and Comparative Examples 6-10

The compositions shown in Table 3 were tested according to ASTM D4340 SAE 319. Compositional amounts in Table 3 are in weight percent based on the total weight of the heat transfer fluid unless otherwise indicated. In addition to the components shown in Table 3 all examples and comparative examples contained a colorant and the balance of the compositions were water.

TABLE 3

| Component | Comp. Ex. 6 | Comp. Ex. 7 | Comp. Ex. 8 | Comp. Ex. 9 | Comp. Ex. 10 | Example 2 | Example 3 | Comp. Ex. 11 | Example 4 |
|---|---|---|---|---|---|---|---|---|---|
| 2-EHA | 2.8857 | 2.8756 | 2.8644 | 2.8660 | 2.8753 | 2.8755 | 2.7914 | 2.8500 | 2.8753 |
| Neodecanoic acid | 0.9619 | 0.9585 | 0.9555 | 0.9553 | 0.9584 | 0.9585 | 0.9305 | 0.9500 | 0.9584 |
| Na-TT | 0.475 | 0.6526 | 0.6718 | 0.4717 | 0.4733 | 0.4733 | 0.4733 | 0.4691 | 0.4733 |
| EG | 93.469 | 93.1432 | 92.8434 | 92.8294 | 93.1331 | 93.1393 | 90.4149 | 92.3123 | 93.1306 |
| PM 5150 | 0.2000 | 0.1993 | 0.1987 | 0.1986 | 0.1993 | 0.1993 | 0.1935 | 0.1975 | 0.1993 |
| $H_3PO_4$ | — | 0.1693 | 0.1693 | 0.1700 | 0.1700 | 0.1700 | 0.1700 | 0.1653 | 0.1700 |
| Tenax WS5520 | — | — | 0.3000 | 0.3000 | — | — | 0.2921 | — | — |
| $Ca(NO_3)_2 \cdot 4 H_2O$ | — | — | — | — | 0.0094 | — | — | — | 0.0094 |
| $Mg(NO_3)_2 \cdot 6 H_2O$ | — | — | — | — | — | 0.0027 | 0.0105 | — | 0.0027 |
| EPML-483 | — | — | — | — | — | — | — | 0.4963 | — |
| Molybdate | — | — | — | — | — | — | — | 0.3459 | — |
| NaOH | 1.9869 | 1.9800 | 1.9736 | 2.1883 | 2.1597 | 2.1599 | 2.0972 | 2.1852 | 2.1597 |
| D4340 Corrosion rate (mg/cm²/wk) | | 4.50 | 1.54 | 2.63 | 4.56 | −0.05 | 0.01 | 4.28 | 1.19 |

Table 3 shows a different set of data comparing the corrosion protection performance of example coolants, (example 2 to example 4) and the comparative coolants (Comp 6 to Comp 11). The results clearly indicate that the example coolants show overall superior corrosion protection performance than the comparative coolants. In particular, the comparison of Comparative Example 10 and Example 2 shows the surprising effect of the magnesium compound. Comparative Example 10 and Example 2 have similar compositions, varying primarily in the kind of metal salt employed. Comparative Example 10 uses $Ca(NO_3)_2$ and has a significantly higher corrosion rate than Example 2 which uses $Mg(NO_3)_2$.

Examples 5-6 and Comparative Examples 12-14

The compositions shown in Table 4 were tested for corrosion protection of controlled atmosphere brazed aluminum. Amounts are in weight percent based on the total weight of the composition. Sheets of AA 3003 aluminum alloy covered with regular amount of potassium fluoroaluminate flux residue were used as the working electrodes in the tests. The metal samples were used as received.

A test cell constructed similar to the one described in Ford Laboratory Test Method (FLTM) BL-105-1 "A Rapid Method to Predict the Effectiveness of Inhibited Coolants in Aluminum Heat Exchangers" was used to conducted the tests. The volume of solution used in a test was about 6 milliliters (ml). A platinum wire was used as counter electrode. A silver/silver chloride (3 M KCl) reference electrode placed in a Luggin probe was used as the reference electrode. The exposed electrode surface area of the small cell is 2.54 cm².

In this test, the test coolant fluid was added to the cell and the flux residue covered aluminum heated until the fluid boiled. The fluid was boiled for one hour, while maintaining the fluid volume by additions of deionized water (if required), and then the temperature of the fluid reduced to 80° C. Once the solution in the cell had reached the temperature of 80° C., the sample was connected to a potentiostat as the working electrode. The open circuit potential was measured for 5 minutes and a potentiodynamic polarization scan started at −20mV vs. the open circuit potential. The potential was scanned at a rate of 2 millivolts per second ($mVs^{-1}$) in the anodic (positive) direction until pitting was observed or the potential reached about 2 volts (V) more anodic than the open circuit potential, whichever happened first. The current was recorded as a function of potential. At the end of the test, samples of fluid, before and after test, were submitted for analysis.

TABLE 4

|  | Comp. Ex. 12 | Example 5 | Example 6 | Comp. Ex. 13 | Comp. Ex. 14 |
|---|---|---|---|---|---|
| EG | 93.469 | 93.1393 | 92.8402 | 92.8427 | 93.1885 |
| Na-TT | 0.475 | 0.4733 | 0.4718 | 0.4718 | 0.4735 |
| NaOH | 1.9869 | 2.1598 | 2.1735 | 2.1735 | 1.9809 |
| Neodecanoic acid | 0.9619 | 0.9585 | 0.9554 | 0.9554 | 0.9590 |
| 2-EHA | 2.8857 | 2.8755 | 2.8662 | 2.8663 | 2.8770 |
| Chromatint Orange 175 | 0.0215 | 0.0214 | 0.0213 | 0.0213 | 0.0214 |
| PM-5150 | 0.2 | 0.1992 | 0.1986 | 0.1986 | 0.1994 |
| $H_3PO_4$ | — | 0.1700 | 0.1700 | 0.1700 | — |
| Tenax WS5520 | — | — | 0.3000 | 0.3000 | — |
| $Mg(NO_3)_2 \cdot 6H_2O$ | — | 0.0027 | 0.0027 | — | — |
| Sebacic acid | — | — | — | — | 0.3000 |

FIG. 1 shows that the Examples 5 and 6 provide substantially better corrosion protection for CAB brazed aluminum than the comparative coolants.

Examples 6-7 and Comparative Example 12

The compositions shown in Table 5 and Comparative Example 12 were tested for corrosion protection of Aluminum 319. Amounts in Table 5 are in weight percent based on the total weight of the composition.

AA 319 (2" diameter×⅜" thick) plate obtained from The Metaspec Co. were used as the electrode. The samples were polished by 600 grit silicon carbide sand paper, cleaned with acetone, and air dried before immersion into the test solution.

A Ford Laboratory Test Method (FLTM) BL-105-1 "A Rapid Method to Predict the Effectiveness of Inhibited Coolants in Aluminum Heat Exchangers" test cell was used to conducted the tests for the sand cast aluminum AA 319 plate sample. The FLTM BL-105-01 test cell would give an exposed aluminum surface area of 8.04 cm². The volume of solution used in a test was about 45 ml. A graphite rod was used as counter electrode. A silver/silver chloride (3 M KCl) reference electrode placed in a Luggin probe was used as the reference electrode. The test solutions used in the tests were prepared according to FLTM BL-105-01 specifications.

Two test conditions were used for the AA 319 metal plate samples. In one test, the test coolant fluid was added to the cell and the aluminum heated until the fluid boiled. The fluid was kept boiling during the test, while maintaining the fluid volume by additions of deionized water (if required). The solution temperature was measured to be 100-103° C. In the other test condition (this test condition was used for the comparative example 12 coolant), the test solution temperature was kept at 85° C. during the test. The test metal surface temperature was about 10° C. higher than the solution temperature for both test conditions. After the solution temperature reached the desired 100° C. or 85° C. for approximately 1 hour, a potentiodynamic polarization scan was started at −20mV vs. the open circuit potential. The potential was scanned at a rate of 2 millivolts per second ($mVs^{-1}$) in the anodic (positive) direction until pitting was observed or the potential reached 2 volts (V) more anodic than the open circuit potential, whichever happened first. The current was recorded as a function of potential.

TABLE 5

|  | Example 7 | Example 8 |
|---|---|---|
| EG | 93.1093 | 93.1084 |
| Na-TT | 0.4750 | 0.4750 |
| NaOH | 2.1941 | 2.1941 |
| Neodecanoic Acid | 0.9600 | 0.9600 |
| 2-EHA | 2.8751 | 2.8751 |
| PM-5150 | 0.2000 | 0.2000 |
| $H_3PO_4$ | 0.1700 | 0.1700 |
| $Mg(NO_3)_2 \cdot 6H_2O$ | 0.0054 | 0.0054 |
| AR-940 | 0.0000 | 0.0010 |
| Colorant | 0.0110 | 0.0110 |

Figure 2:
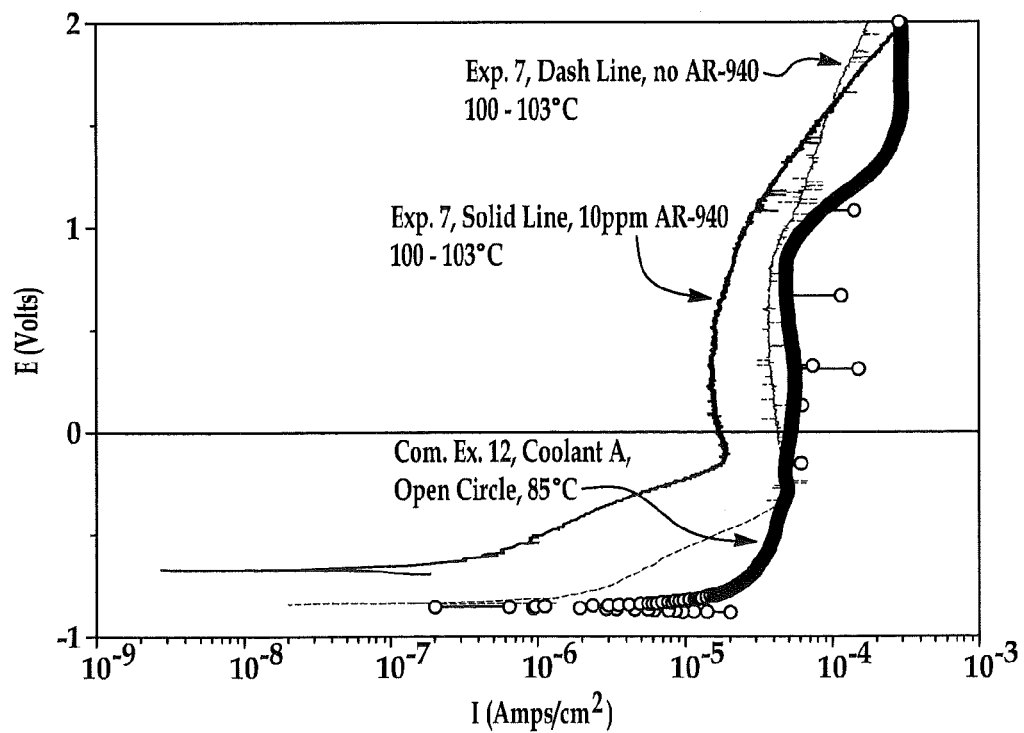
FIG. 2 is a polarization curve for Examples 7, 8 and Comparative Example 12.

FIG. 2 shows that Examples 7 and 8 provide better corrosion protection for Aluminum 319 than Comparative Example 12, even though the test for comparative example 12 coolant was conducted at a lower solution temperature (i.e., less corrosive conditions).

Example 5 and Comparative Example 15-22

Three types of radiators and two heater cores from three models of recently introduced North American light duty vehicles were selected for use. The radiators and heater cores were produced by different manufacturers based in North America, Europe or Japan. Two radiators and the two heater cores have folded tubes (B type tubes). The capacity of the two heater cores was measured to be 1.65 ml and ~4 ml per tube cavity. The capacity of the two B-type radiators is approximately 9 and 11 ml per tube cavity. The capacity of the other radiator is approximately 29.5 ml per tube cavity. After removing the header and crimping one end of the radiator or heater core tubes mechanically to reduce the opening, a general purpose, non-electrically conductive and chemically inert epoxy was used to seal one end of the radiator and heater core tubes. After overnight curing at room temperature, the radiator or heater core tubes were separated into individual tubes or groups of tubes (i.e., 8 tubes per group for heater core 1, 2 tubes per group for heater core 2, and 2 or 4 tubes per group for the B-type radiator) mechanically. After the test coolant was added into each radiator or heater core tube, the other ends of the tubes were sealed with bee's wax (for tubes for used in room temperature tests) or a high temperature chemically inert epoxy. Afterwards, the coolant filled and sealed tubes were placed in the intended test environment either at 20±1° C. or at 90° C. in an oven to start the leaching tests. The coolant solution in the tubes was sampled after 7 days, 28 days or 56 days exposure into a clean and chemically inert container and submitted for analysis.

The coolant was diluted 50 volume percent with water unless otherwise noted as "prediluted". The compositions of Coolant A through Coolant F are shown in Table 6. Amounts are in weight percent based on the total weight of the composition prior to dilution for the Coolants A-D. Amounts are in weight percent based on the total weight of the prediluted composition for Coolants E and F. Coolants A-F are commercially available and the compositions shown in Table 6 are the result of chemical analysis.

TABLE 6

|  | Coolant A | Coolant B | Coolant C | Coolant D | Coolant E, Prediluted | Coolant F, Prediluted |
| --- | --- | --- | --- | --- | --- | --- |
| EG | >90 | >90 | >90 | >89 | >49 | >49 |
| Tolytriazole | 0.1-0.3 | 0.1-0.3 | 0.1-0.3 | — | 0.1-0.3 | 0.1-0.3 |
| Nitrate | — | 0.2-0.5 | <0.05 | 0.1-0.4 | 0.1-0.2 | 0.1-0.2 |
| Nitrite | — | — | 0.05-0.2 | 0 | — | — |
| Molybdate | — | — | 0.1-0.5 | 0.1-0.5 | — | — |
| Phosphoric acid | — | — | — | 0.5-1 | 0.1-0.5 | 0.05-0.3 |
| Mecaptobenzothiazole | — | — | — | 0.05-0.3 | 0.05-0.1 | 0.05-0.1 |
| Benzotriazole | — | — | — | 0.1-0.2 | — | — |
| 2-EHA | 1.7-3.5 | — | 1.7-3.5 | — | — | — |
| Sebacic Acid | — | 1.0-3.5 | 0.1-0.4 | — | 0.5-1.2 | 0.5-1.2 |
| Neodecanoic Acid | 0.1-1.5 | — | — | — | — | — |
| Benzoic Acid | — | — | — | 1.0-5.0 | — | — |
| t-butyl benzoic acid | — | — | — | — | 0.3-1.0 | 0.3-0.8 |
| Methoxybenzoic acid | — | — | — | — | 0.3-1.0 | <1.0 |
| NaOH/KOH | 0.4-2.0 | 0.4-2.0 | 0.4-3.0 | 0.4-5.0 | 0.4-3.0 | 0.4-3.0 |
| Water, antifoam and dye | Balance | Balance | Balance | Balance | Balance | Balance |

The compositions of the coolants used for testing is shown in Table 7. Results are shown in Tables 8 and 9.

TABLE 7

|  | Comp. Ex. 15 | Comp. Ex. 16 | Comp. Ex. 17 | Comp. Ex. 18 | Comp. Ex. 19 | Comp. Ex. 20 | Comp. Ex. 21 | Comp. Ex. 22 |
| --- | --- | --- | --- | --- | --- | --- | --- | --- |
| Coolant A | 50 vol. % | 333.5 grams | 667 grams |  |  |  |  |  |
| Water | 50 vol % | 300 ml | 600 ml | 50 vol % | 50 vol % | 50 vol % |  |  |
| Bayhibit ® AM |  | 0.2668 grams | 0.5336 grams |  |  |  |  |  |
| NaOH |  | 0.1700 grams | 2.2243 grams |  |  |  |  |  |
| $H_3PO_4$ |  |  | 1.6675 grams |  |  |  |  |  |
| $Mg(NO_3)_2 \cdot 6 H_2O$ |  |  | 0.03603 grams |  |  |  |  |  |
| Coolant B |  |  |  | 50 vol % |  |  |  |  |
| Coolant C |  |  |  |  | 50 vol % |  |  |  |
| Coolant D |  |  |  |  |  | 50 vol % |  |  |
| Coolant E (prediluted) |  |  |  |  |  |  | 100 vol % |  |
| Coolant F (prediluted) |  |  |  |  |  |  |  | 100 vol % |

TABLE 8

|  | Comp. Ex. 15 | | | | Comp. Ex. 16 | |
| --- | --- | --- | --- | --- | --- | --- |
|  | Fresh coolant | Radiator 1, Welded tube 90° C., after 7 days | Radiator 2, B-type tube 90° C., after 7 days | Radiator 3, B-type tube 90° C., after 7 days | Fresh coolant | Radiator 1, Welded tube 90° C., after 7 days |
| $NH_4^+$, mg/L |  |  |  |  |  |  |
| pH, as is | 8.60 | 8.81 | 8.12 | 7.77 | 8.84 | 8.54 |
| EG, vol % | 51.1 | 53.2 | 51.4 | 53.8 | 51.5 | 52.5 |
| Silicon, mg/L | <2 | <2 | <2 | <2 | <2 | <2 |
| Aluminum, mg/L | <2 | <2 | <2 | <2 | <2 | 17 |
| Potassium, mg/L | 4.5 | 220 | 370 | 570 | 3.5 | 190 |
| Phosphorous, mg/L | <2 | <2 | <2 | <2 | 25 | 18 |
| Chloride, mg/L | <10 | <10 | <10 | <10 | <10 | <10 |
| Nitrate, mg/L | NA | ND | ND | ND | NA | NA |
| Nitrite, mg/L | NA | ND | ND | NA | NA | NA |
| Fluoride, mg/L | ND | 32 | 21 | 15 | ND | 94 |

TABLE 8-continued

|  | Comp. Ex. 17 | | | Ex. 5 | | |
| --- | --- | --- | --- | --- | --- | --- |
|  | Fresh Coolant | Radiator 1, Welded tube 90° C., after 7 days | Radiator 2, B-type tube 90° C., after 7 days | Fresh Coolant | Radiator 1, Welded tube 90° C., after 7 days | Radiator 2, B-type tube 90° C., after 7 days |
| $NH_4^+$, mg/L |  |  |  |  |  |  |
| pH, as is | 8.60 | 8.33 | 8.23 | 8.22 | 8.05 | 8.10 |
| EG, vol % | 51.9 | 52.6 | 55.3 | 51.4 | 52.5 | 55.5 |
| Silicon, mg/L | <2 | <2 | <2 | <2 | 2.1 | 2.8 |
| Aluminum, mg/L | <2 | 3.5 | 4.7 | <2 | <2 | <2 |
| Potassium, mg/L | 4.5 | 170 | 140 | 4.5 | 150 | 120 |
| Phosphorous, mg/L | 350 | 340 | 350 | 210 | 200 | 220 |
| Chloride, mg/L | <10 | <10 | 12 | <10 | <10 | <10 |
| Nitrate, mg/L | NA | NA | <10 | <10 | ND | ND |
| Nitrite, mg/L | NA | NA | ND | ND | ND | ND |
| Fluoride, mg/L | ND | 60 | 81 | ND | 50 | 32 |

|  | Comp. Ex. 18 | | | Comp. Ex. 19 | | |
| --- | --- | --- | --- | --- | --- | --- |
|  | Fresh Coolant | Radiator 1, Welded tube 90° C., after 7 days | Radiator 2, B-type tube 90° C., after 7 days | Fresh Coolant | Radiator 1, Welded tube 90° C., after 7 days | Radiator 2, B-type tube 90° C., after 7 days |
| $NH_4^+$, mg/L | ND | 50 | 65 |  |  |  |
| pH, as is | 8.67 | 9.44 | 8.44 | 8.20 | 9.88 | 7.78 |
| EG, vol % | 50.3 | 50.5 | 51.3 | 50.3 | 50.3 | 51.2 |
| Silicon, mg/L | 3.5 | 0.1 | 0.5 | <2 | <2 | <2 |
| Aluminum, mg/L | 0.7 | 6.7 | 0.4 | <2 | 11 | 2.2 |
| Potassium, mg/L | 2.66 | 93.2 | 480 | 5600 | 5100 | 5800 |
| Phosphorous, mg/L | 0.2 | 0.5 | 0.1 | 2.2 | <2 | <2 |
| Chloride, mg/L | <10 | <10 | <10 | <10 | <10 | <10 |
| Nitrate, mg/L | 803 | 667 | 680 | 42 | 46 | 48 |
| Nitrite, mg/L | NA | 25 | 15 | 503 | 25 | 453 |
| Fluoride, mg/L | ND | 50 | 32 | ND | 138 | 22 |

|  | Comp. Ex. 20 | | Comp. Ex. 21 | | |
| --- | --- | --- | --- | --- | --- |
|  | Fresh Coolant | Radiator 1, Welded tube 90° C., after 7 days | Fresh Coolant | Radiator 1, Welded tube 90° C., after 7 days | Radiator 2, B-type tube 90° C., after 7 days |
| $NH_4^+$, mg/L |  |  |  |  |  |
| pH, as is | 7.50 | 7.45 | 7.74 | 7.82 | 7.71 |
| EG, vol % | 51.8 | 51.9 | 50.9 | 51 | 51.4 |
| Silicon, mg/L | <2 | <2 | 5.0 | 2.1 | 5.8 |
| Aluminum, mg/L | <2 | 4.6 | 0.0 | 2.6 | 0.8 |
| Potassium, mg/L | 2500 | 2500 | 6670 | 7600 | 7520 |
| Phosphorous, mg/L | 1000 | 1000 | 388.3 | 379.6 | 334.8 |
| Chloride, mg/L | <10 | <10 | 10 | 13 | 12 |
| Nitrate, mg/L | 1004 | 996 | 1521 | 1615 | 1556 |
| Nitrite, mg/L | ND | ND | NA | ND | ND |
| Fluoride, mg/L | ND | 46 | ND | 29 | 96 |

|  | Comp. Ex. 22 | | | |
| --- | --- | --- | --- | --- |
|  | Fresh Coolant | Radiator 1, Welded tube 90° C., after 7 days | Radiator 2, B-type tube 90° C., after 7 days | Radiator 3, B-type tube 90° C., after 7 days |
| $NH_4^+$, mg/L |  |  |  |  |
| pH, as is | 8.20 | 8.22 | 8.03 | 8.05 |
| EG, vol % | 52.5 | 52.5 | 53.2 | 56.5 |
| Silicon, mg/L | <2 | <2 | <2 | <2 |
| Aluminum, mg/L | <2 | 4.3 | 5.9 | 5.9 |
| Potassium, mg/L | 7800 | 6300 | 7500 | 840 |
| Phosphorous, mg/L | 270 | 260 | 250 | 260 |
| Chloride, mg/L | <10 | <10 | <10 | <10 |
| Nitrate, mg/L | 1424 | 1305 | 1270 | 1422 |
| Nitrite, mg/L | ND | ND | ND | ND |
| Fluoride, mg/L | ND | 44 | 76 | 95 |

ND = none detected; NA = not analyzed

TABLE 9

| | Comp. Ex. 21 | | | | Example 5 | | | |
|---|---|---|---|---|---|---|---|---|
| | Fresh Coolant | Radiator 1, Welded Tube 20° C., after 28 days | Radiator 2, B-type 20° C., after 28 days | Heater Core 1, B-Type 20° C., after 28 days | Fresh Coolant | Radiator 1, Welded Tube 20° C., after 28 days | Radiator 2, B-type 20° C., after 28 days | Heater Core 1, B-type 20° C., after 28 days | Heater Core 2, B-type 20° C., after 28 days |
| Observation | — | Moderate amt ppt | Moderate amt ppt | Moderate amt ppt | — | Minor ppt | Minor ppt | Minor ppt | Minor ppt |
| Aluminum, mg/L | ND | 3 | 7 | 12 | ND | ND | ND | ND | ND |
| Potassium, mg/L | NA | NA | NA | NA | 5 | 59 | 50 | 16 | 37 |
| Fluoride, mg/L | ND | 4 | 7 | 6 | ND | 12 | 13 | 4 | 6 |

ND = none detected; NA = not analyzed

The presence of aluminum in the heat transfer fluid after being subjected to testing conditions is indicative of aluminum corrosion. As can be seen from the Tables 7, 8 and 9, heat transfer fluids (coolants) having a combination of a magnesium compound, an inorganic phosphate, an aliphatic carboxylic acid (or salt thereof) and one or more components selected from the group consisting of azole compounds, copper alloy corrosion inhibitors, phosphonocarboxylates, phosphinocarboxylates have substantially less aluminum present after being subjected to test conditions than the comparative examples. Coolants containing nitrate, nitrite, or 2-phosphonobutane-1,2,4-tricarboxylic acid (i.e., PBTC or Bayhibit® AM) were found to contain elevated level of aluminum ions in the post leaching test coolant samples taken from the radiator or heater core tubes.

Comparative Example 21

Commercial potassium fluoroaluminate flux residue samples were used to determine flux solubility in a heat transfer fluids. The room temperature solubility results were determined by adding 0.05%, 0.10%, 0.30% and 0.50% by weight of potassium fluoroaluminate flux residue in samples of Comparative Example 21. The total weight of each of the solution was 25 g. After mixing the flux residues in the coolant solutions for 1 hour at room temperature (e.g., 20±1° C.), the solutions were vacuum filtered through a 0.45 μm filter. The filtered solutions were then analyzed by ICP (Inductively Coupled Plasma Atomic Emission Spectrometry), and IC (Ion Chromatography) for fluoride concentration. Results are shown in Table 10 below.

TABLE 10

| | Flux Residue Concentration, g/kg | | | | |
|---|---|---|---|---|---|
| | 0.0 | 0.5 | 1.0 | 3.0 | 5.0 |
| Aluminum, mg/L | ND | ND | ND | ND | ND |
| Fluoride, mg/L | ND | 10 | 3 | 6 | 8 |

ND = none detected

This data shows that presence of aluminum in the leaching data of Table 8 for Comparative Example 21 is due to corrosion, not to flux solubility.

Examples 9-10

The compositions shown in Table 11 were tested according to ASTM D4340 using SAE 319 sand cast aluminum alloy as the test specimens. Amounts in Table 11 are in weight percent based on the total weight of the heat transfer fluid.

TABLE 11

| | Example 9 | Example 10 |
|---|---|---|
| EG | 93.1033 | 93.1042 |
| Na-TT | 0.4750 | 0.4750 |
| NaOH | 2.2001 | 2.2001 |
| Neodecanoic Acid | 0.9600 | 0.9600 |
| 2-EHA | 2.8751 | 2.8751 |
| PM-5150 | 0.2000 | 0.2000 |
| $H_3PO_4$ | 0.1700 | 0.1700 |
| Magnesium acetate tetrahydrate | 0.0045 | 0.0045 |
| AR-940 | 0.0010 | 0.0000 |
| Dye and colorants | 0.0110 | 0.0110 |
| ASTM D4340 Results, Corrosion Rate, mg/cm$^2$/week | −0.01 | 0.00 |

The ASTM D4340 results show that using a nitrate free coolant composition comprising magnesium ions, an aliphatic carboxylic acid (or salt thereof), an inorganic phosphate, and at least one component selected from the group consisting of azole compounds, copper alloy corrosion inhibitors, phosphonocarboxylates, and phosphinocarboxylates prevents aluminum corrosion.

Additionally, it has been found that coolant compositions comprising magnesium ions, an aliphatic carboxylic acid (or salt thereof), an inorganic phosphate, and at least one component selected from the group consisting of azole compounds, copper alloy corrosion inhibitors, phosphonocarboxylates, and phosphinocarboxylates prevents aluminum corrosion demonstrate decreased long term coolant degradation as shown by the data in Table 12.

TABLE 12

| | Comp. Ex. 15 | | Example 5 | |
|---|---|---|---|---|
| | Fresh Coolant | After 8 weeks at 90° C. | Fresh Coolant | After 8 weeks at 90° C. |
| Formate, mg/L | 20 | 43 | 14 | 12 |
| Glycolate | 18 | 106 | <10 | <10 |
| Acetate | <10 | 13 | <10 | <10 |

The singular forms "a," "an," and "the" include plural referents unless the context clearly dictates otherwise. The endpoints of all ranges reciting the same characteristic or component are independently combinable and inclusive of the recited endpoint. All references are incorporated herein by reference. The terms "first," "second," and the like herein do not denote any order, quantity, or importance, but rather are used to distinguish one element from another. The various embodiments and ranges described herein are combinable to the extent that the description is not contradictory.

While typical embodiments have been set forth for the purpose of illustration, the foregoing descriptions should not be deemed to be a limitation on the scope herein. Accordingly, various modifications, adaptations, and alternatives may occur to one skilled in the art without departing from the spirit and scope herein.

The invention claimed is:

1. A heat transfer fluid comprising
   a freezing point-depressant;
   an aliphatic carboxylic acid, a salt thereof, or a combination of the foregoing;
   an inorganic phosphate;
   a magnesium compound;
   deionized water, and
   a component selected from the group consisting of azole compounds, copper alloy corrosion inhibitors, phosphonocarboxylates, phosphinocarboxylates, and combinations of two or more of the foregoing components,
   wherein the magnesium compound is present in an amount such that the heat transfer fluid has a magnesium ion concentration of 0.5 to 100 parts per million by weight; and
   wherein the heat transfer fluid is free of silicates and borates.

2. The heat transfer fluid of claim 1 further comprising a colorant, polymer dispersant, scale inhibitor, wetting agent, biocide, or combination thereof.

3. The heat transfer fluid of claim 1 comprising less than or equal to 80 ppm of nitrate, less than or equal to 0.03 weight percent of 2-phosphonobutane-1,2,4-tricarboxylic acid and its salts and free of ammonium ions and ammonia.

4. The heat transfer fluid of claim 1 comprising less than or equal to 40 ppm of nitrate and free of nitrite, 2-phosphonobutane-1,2,4-tricarboxylic acid and its salts, ammonium ions, and ammonia.

5. The heat transfer fluid of claim 1, wherein the heat transfer fluid is free of nitrite, nitrate, ammonia, ammonium ions, 2-phosphonobutane-1,2,4-tricarboxylic acid and its salts.

6. The heat transfer fluid of claim 1, wherein the freezing point depressant comprises an alcohol or mixture of alcohols and is present in an amount of about 10 weight percent to about 99.9 weight percent based on the total weight of the heat transfer fluid.

7. The heat transfer fluid of claim 1, wherein the aliphatic carboxylate has 6 to 15 carbon atoms and is present in an amount of about 0.05 weight percent to about 10 weight percent, based on the total weight of the heat transfer fluid.

8. The heat transfer fluid of claim 1, wherein the inorganic phosphate is present in an amount of about 0.0002 weight percent to about 5 weight percent, based on the total weight of the heat transfer fluid.

9. The heat transfer fluid of claim 1, wherein the magnesium compound is an inorganic compound selected from the group consisting of magnesium nitrate, magnesium sulfate and combinations of magnesium nitrate and magnesium sulfate.

10. The heat transfer fluid of claim 1, wherein the magnesium compound is a magnesium salt formed between a magnesium ion and an organic acid containing one or more carboxylic acid groups.

11. The heat transfer fluid of claim 1, wherein the magnesium compound is a compound selected from the group consisting of magnesium polyacrylate, magnesium polymaleate, magnesium lactate, magnesium citrate, magnesium tartrate, magnesium gluconate, magnesium glucoheptonate, magnesium glycolate, magnesium glucarate, magnesium succinate, magnesium hydroxysuccinate, magnesium adipate, magnesium oxalate, magnesium malonate, magnesium sulfamate, magnesium formate, magnesium acetate, magnesium propionate, magnesium salt of aliphatic tri-carboxylic acid or aliphatic tetra-carboxylic acid, and combinations of the foregoing magnesium compounds.

12. The heat transfer fluid of claim 1, wherein the magnesium compound is present in an amount of about 0.5 to about 100 parts per million by weight of the heat transfer fluid.

13. The heat transfer fluid of claim 1, wherein the azole compound is present in an amount of about 0.01 wt % to about 4 wt %, based on the total weight of the heat transfer fluid.

14. The heat transfer fluid of claim 1, wherein the phosphonocarboxylate has the general formula

$$H[CHRCHR]_n\!-\!PO_3M_2$$

wherein at least one R group in each unit is a COOM, $CH_2OH$, sulphono or phosphono group and the other R group which may be the same as, or different from, the first R group, is a hydrogen or a COOM, hydroxyl, phosphono, sulphono, sulphato, $C_{1-7}$ alkyl, $C_{1-7}$ alkenyl group or a carboxylate, phosphono, sulphono, sulphato and/or hydroxyl substituted $C_{1-7}$ alkyl or $C_{1-7}$ alkenyl group, n is 1 or an integer greater than 1, and each M is hydrogen or an alkali metal ion.

15. The heat transfer fluid of claim 1, wherein the phosphonocarboxylate is present in an amount of about 0.5 ppm to about 0.15 wt %, based on the total weight of the heat transfer fluid.

16. The heat transfer fluid of claim 1, wherein the phosphinocarboxylate has the general formula

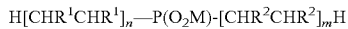
$$H[CHR^1CHR^1]_n\!-\!P(O_2M)\!-\![CHR^2CHR^2]_m H$$

wherein at least one $R^1$ group in each unit is a COOM, $CH_2OH$, sulphono or phosphono group and the other $R^1$ group which may be the same as, or different from, the first $R^1$ group, is a hydrogen or a COOM, hydroxyl, phosphono, sulphono, sulphato, $C_{1-7}$ alkyl, $C_{1-7}$ alkenyl group or a carboxylate, phosphono, sulphono, sulphato and/or hydroxyl substituted $C_{1-7}$ alkyl or $C_{1-7}$ alkenyl group, n is an integer equal to or greater than 1, and each M is hydrogen or an alkali metal ion such as a sodium ion, potassium ion and the like. Similarly, at least one $R^2$ group in each unit is a COOM, $CH_2OH$, sulphono or phosphono group and the other $R^2$ group which may be the same as, or different from, the first $R^2$ group, is a hydrogen or a COOM, hydroxyl, phosphono, sulphono, sulphato, $C_{1-7}$ alkyl, $C_{1-7}$ alkenyl group or a carboxylate, phosphono, sulphono, sulphato and/or hydroxyl substituted $C_{1-7}$ alkyl or $C_{1-7}$ alkenyl group, m is an integer equal to or greater than 0.

17. The heat transfer fluid of claim 1, wherein the phosphinocarboxylate is present in an amount of about 0.5 ppm to about 0.2 wt %, based on the total weight of the heat transfer fluid.

18. The heat transfer fluid of claim 1, wherein the heat transfer fluid further comprises one or more water soluble polymers.

19. A heat transfer system comprising the heat transfer fluid of claim 1 and a heat transfer apparatus.

20. A method of preventing corrosion comprising contacting the heat transfer fluid of claim 1 with a heat transfer system.

* * * * *